(12) United States Patent
Albisu (10) Patent No.: US 8,543,828 B2
(45) Date of Patent: Sep. 24, 2013

(54) AUTHENTICATING A USER WITH HASH-BASED PIN GENERATION

(75) Inventor: Luis F. Albisu, Fairfax Station, VA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 213 days.

(21) Appl. No.: 12/961,163

(22) Filed: Dec. 6, 2010

(65) Prior Publication Data

US 2012/0144203 A1 Jun. 7, 2012

(51) Int. Cl.
*G06F 21/00* (2013.01)
*H04L 9/32* (2006.01)
*G06F 7/04* (2006.01)
*G06Q 20/00* (2012.01)

(52) U.S. Cl.
USPC ........... 713/184; 713/168; 713/178; 713/179; 726/5; 726/26; 705/72

(58) Field of Classification Search
USPC ............... 713/184, 168, 178, 179; 726/5, 726/26; 705/72
See application file for complete search history.

(56) References Cited

U.S. PATENT DOCUMENTS

| | | | |
|---|---|---|---|
| 6,928,558 B1 * | 8/2005 | Allahwerdi et al. | 726/9 |
| 7,636,694 B1 | 12/2009 | Wankmueller | |
| 7,702,915 B2 | 4/2010 | McCann | |
| 7,766,223 B1 | 8/2010 | Mello | |
| 2007/0005963 A1 * | 1/2007 | Eldar et al. | 713/168 |
| 2009/0327733 A1 * | 12/2009 | McDougal et al. | 713/176 |
| 2010/0120409 A1 | 5/2010 | Shieh | |
| 2010/0146263 A1 | 6/2010 | Das | |
| 2010/0185544 A1 | 7/2010 | Adiseshann | |
| 2010/0284268 A1 * | 11/2010 | Zhu | 370/217 |
| 2010/0299746 A1 * | 11/2010 | Shu | 726/18 |
| 2011/0130120 A1 * | 6/2011 | Hoeksel et al. | 455/411 |

* cited by examiner

Primary Examiner — Aravind Moorthy
(74) Attorney, Agent, or Firm — Hartman & Citrin LLC (57) ABSTRACT

Systems and methods for authenticating a user of a service are disclosed. A Personal Identification Number (PIN) is generated using a plurality of variables, and a user is authenticated by comparing the PIN generated at the user's mobile device with a PIN generated on an authentication server. The authentication enables the user to access a service or resource hosted on a host server. When requesting access to the resource, the user generates a device PIN and transmits the device PIN along with their unique key into the host server. The host server forwards the device PIN and the key to the authentication server. The authentication server generates a server PIN and compares the server PIN to the device PIN. If the two PINS match, the authentication server transmits a successful authentication response to the host server.

16 Claims, 6 Drawing Sheets

AUTHENTICATING A USER WITH HASH-BASED PIN GENERATION

BACKGROUND OF THE SUBJECT DISCLOSURE

1. Field of the Subject Disclosure

The present subject disclosure relates to authenticating users. In particular, the present subject disclosure relates to authenticating a user of a service by generating a Personal Identification Number (PIN) code on the user's mobile device.

2. Background of the Subject Disclosure

As more people access more information online or across networks, there is a greater chance that sensitive information can come into the wrong hands. Increasingly, banks, insurance companies, and other service providers are enabling people to access services online, such as account downloads, payments, etc. The service is typically accessed via a web-site hosted on a web server or a host server. Further, other types of access systems are being provided with network connectivity. For instance, security systems, building access systems, etc., have network interfaces to connect to a remote server across the internet, to provide status reports, raise alarms, etc. These security systems have control panels that enable users to change the settings, or allow access to a secure resource.

Security is an increasing concern as the internetworking capabilities of these systems converge. Without proper layers of authentication, unauthorized users can gain access to sensitive information and secure services stored online to which they should not have access. Although a name and password are typically used to authenticate users, this system relies on only a single layer of authentication and can be bypassed or "hacked" by a remote user having the right set of tools.

Present-day solutions to overcome these security concerns are limited in their efficacy and ease of use. Some secure web-sites use RSA cryptography, such as implementing an RSA secure ID token for authenticating a user. IP addresses of terminals and computers can be recorded and stored so as to properly identify a user. However, these methods do not ensure that the appropriate user is accessing the service, as this information is typically static and can be "forged" by experienced hackers. Moreover, adding higher-level layers of security, such as biometric identifiers, etc., is expensive as it requires implementing additional scanners and processing units to a network and to the users of these services.

What is therefore needed is the ability to authenticate a user of a service that makes optimal use of existing system infrastructure and that is easy for a user to use.

SUMMARY OF THE SUBJECT DISCLOSURE

The present subject disclosure solves the above problems by generating a PIN using a plurality of variables, and authenticating the user by comparing a PIN generated at the user's mobile device with a PIN generated on an authentication server. The authentication enables the user to access a service or resource hosted on a host server over a network, for instance, a web server. An operator of the host server provisions the authentication server with a list of potential users requiring authentication. The list includes a key for the user, and in some embodiments, an identifier of the mobile device of the user. The authentication server in turn provides the host server a link to a mobile device PIN generation application. The user accesses the host server and downloads the PIN generation application onto their mobile device. When requesting access to the resource, the user generates a PIN on the mobile device (hereinafter referred to as a "device PIN"), and transmits the device PIN along with their unique key into the host server. The host server forwards the device PIN and the key to the authentication server. The authentication server generates its own PIN (hereinafter referred to as a "server PIN"), and compares the server PIN to the device PIN. If the two PINs match, the authentication server transmits a successful authentication response to the host server.

For the two PINs to match, it is essential that the generation process at both the device and the authentication server be identical. The PIN generation process is a standard hash process, such as MD5 or SHA1, and uses a plurality of variables from which the PIN is generated. These variables include at least the key provided by the user, a device identifier, and a current date/time. The hash value generated from these variables is parsed to either an odd or an even value of a fixed length. The determination of odd/even and PIN length is made by the operator of the host device, or by the user of the service. The device identifier is one of a unique identifier of the hardware on the mobile device, such as an International Mobile Equipment Identity (IMEI) or Serial Number, or a unique identifier of a communication channel between the mobile device and a node on the mobile network, such as a base station. This combination of the device identifier and the key ensures that only an authorized user is allowed access to the service.

In one exemplary embodiment, the present subject disclosure is a method for authenticating a user of a service offered by a host. The method includes generating a server Personal Identification Number (PIN) based upon a current time, a device identifier, and a key, receiving a device PIN from the host, and comparing the server PIN with the device PIN to authenticate the user. The method further includes provisioning a user database with a plurality of device identifiers and a corresponding plurality of keys, wherein said plurality of device identifiers and corresponding plurality of keys are provided by the host. The key is received from the host a corresponding device identifier from the user database. The key includes one or both of a username and a password. The device identifier is a unique hardware identifier of the mobile device, or a unique identifier of a communication channel between the mobile device and a mobile network. Generating the server PIN further includes computing a hash value based upon the current time, the device identifier, and the key, parsing the hash value using one of an odd and an even function to generate the server PIN, and limiting the server PIN to a defined length. Similarly, PIN generation logic on the mobile device is programmed to generate the device PIN using the parsing function and defined length provided by the host.

In another exemplary embodiment, the present subject disclosure is a system for authenticating a user of a service offered by a host. The system includes a mobile device on a network, a host server in communication with the mobile device via the network, an authentication server in communication with the host server, device logic on the mobile device for generating a device personal identification number (PIN), host logic on the host server for receiving the device PIN and a key input by the user and for forwarding the device PIN and the key to the authentication server, and authentication logic on the authentication server for generating a server PIN and comparing the server PIN to the device PIN to authenticate the user. The device PIN and the server PIN are generated by computing a hash value based upon a current time, a device identifier, and the key.

In yet another exemplary embodiment, the present subject disclosure is a method for authenticating a user of a service, including generating a device personal identification number (PIN) on a mobile device of the user, providing the device PIN along with a unique key to a host server hosting the service for authentication, wherein the device PIN is generated by computing a hash value based upon a current time, a device identifier, and the unique key. The method, further includes installing a PIN generation logic on the mobile device, and programming the PIN generation logic to generate the device PIN using a parsing function and a PIN length defined by an operator of the host server.

DETAILED DESCRIPTION OF THE SUBJECT DISCLOSURE

The following disclosure presents a novel technique for authenticating a user of a service. In exemplary embodiments, the service is offered by a host or a service provider. The user accesses the service via an interface on a computer or a mobile device. The interface may be hosted on a host server on a network, such as a web server on the internet. An operator of the host server contracts with a network operator, such as a telecommunication company, and provisions an authentication server on the telecommunication network with a list of potential users requiring authentication. The list includes a key for each user, and in some embodiments, an identifier of the mobile device of each user. The authentication server in turn provides the host server a link to a mobile device PIN generation application. The host server updates their logon screen with the link to the PIN generation application.

A user subsequently accesses the host server and downloads the PIN generation application onto their mobile device. When requesting access to the resource, the user generates a PIN on the mobile device (hereinafter referred to as a "device PIN"), and transmits the device PIN along with their unique key into the host server. The host server forwards the device PIN and the key to the authentication server. The authentication server generates its own PIN (hereinafter referred to as a "server PIN"), and compares the server PIN to the device PIN. If the two PINs match, the authentication server transmits a successful authentication response to the host server. For the two PINs to match, it is essential that the generation process at both the device and the authentication server be identical. The PIN generation process is a standard hash process, such as MD5 or SHA1, and uses a plurality of variables from which the PIN is generated. These variables include at least the key provided by the user, a device identifier, and a current date/time. The hash value generated from these variables is parsed to either an odd or an even digit of a fixed length. The determination of odd/even and PIN length is made by the operator of the host device, or by the user of the service. The device identifier is one of a unique identifier of the hardware on the mobile device, such as an IMEI or Serial Number, or a unique identifier of a communication channel between the mobile device and a node on the mobile network, such as a base station. This combination of the device identifier and the key ensures that only an authorized user is allowed access to the service.

For the purposes of the following disclosure, a cryptographic hash function, or a "hash function" is a deterministic procedure that takes an arbitrary block of data and returns a fixed-size bit string, or the (cryptographic) hash value. Any, change to the block of data, whether accidental or intentional, will substantially change the hash value. An ideal hash function makes it easy to compute the hash value for any given data, makes it unfeasible to trace the data that has a given hash value, renders it impossible to modify the data without changing its hash value, and makes it unfeasible to find two different data blocks with the same hash value. Examples of hash functions include MD5, SHA1, etc. A personal identification number, or PIN, for the purposes of the present disclosure, is any hash value that has been processed with an odd or even parity, and is set to a fixed length.

A key, as used herein and throughout this disclosure, is any unique identifier defined by a user and used as a first layer of authentication. In most instances, a key is a username and/or a password. Other types of keys will become apparent to a person having ordinary skill in the art in light of this disclosure. Further, a key has to be in such a form that it may be processed by a hash function, in combination with other data, to return a hash value. In most cases, this would include any string of alphanumeric characters.

As used herein and throughout this disclosure, the term "mobile device" refers to any electronic device capable of wirelessly sending and receiving data. A mobile device may have a processor, a memory, a transceiver, a display, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic", as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a telecommunication network, logic may be programmed on a server, or a complex of servers. A particular logic unit is not limited to a single logical location on the telecommunication network.

Mobile devices communicate with each other and with other elements via a network, for instance, a wireless network, or a wireline network. A "network" can include broadband wide-area networks such as cellular networks, localarea networks (LAN), wireless LAN (Wi-Fi), near-field communication (NFC) networks, etc. Networks include combinations of networks, such as the Internet. Communication across a network is preferably packet-based; however, radio and frequency/amplitude modulations networks can enable communication between communication devices using appropriate analog-digital-analog converters and other elements. Communication is enabled by hardware elements called "transceivers." Mobile devices may have more than one transceiver, capable of communicating over different networks. For example, a cellular telephone can include a cellular transceiver for communicating with a cellular base station, a Wi-Fi transceiver for communicating with a Wi-Fi network, and a BLUETOOTH® transceiver for communicating with a BLUETOOTH® device.

A network typically includes a plurality of elements that host logic for performing tasks on the network. The logic can be hosted on servers. In modern packet-based wide-area networks, servers may be placed at several logical points on the network. Servers may further be in communication with databases and can enable communication devices to access the contents of a database. Authentication servers, application servers, etc. are examples of such servers. A server can include several network elements, including other servers, and can be logically situated anywhere on a service provider's network, such as the back-end or "core network" portion of a cellular network.

For the following description, it can be assumed that most correspondingly labeled structures across the figures (e.g., 141 and 241, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern. The only exception is method steps (S101, S301, etc.) that need not be correspondingly labeled.

Figure 1:
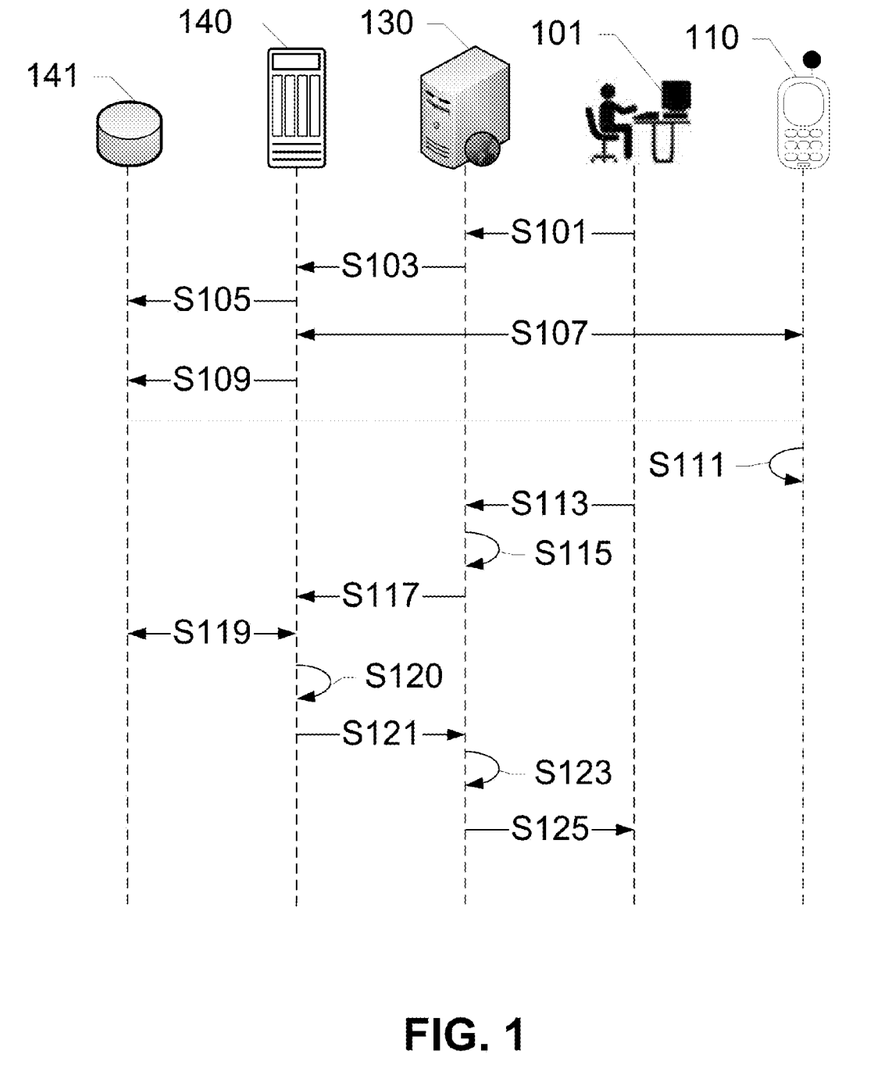
FIG. 1 shows a network flow diagram for authenticating a user, according to an exemplary embodiment of the present subject disclosure.

FIG. 1 shows a network flow diagram, according to an exemplary embodiment of the present subject disclosure. A user on a terminal 101 is able to access host server 130 over a network such as the Internet. The user further owns a mobile device 110. Host server 130 communicates with authentication server 140 over one or more networks. Authentication server 140 is operated by the same network operator that provides network coverage to mobile device 110. Authentication server 140 is in communication with database 141. According to this exemplary embodiment, the user accesses a service hosted on host server 130 via terminal 101. The service can be an online service, such as accessing the user's bank account information online, logging into any user account, etc. If terminal 101 is accessing host server 130 for the first time, as in S101, then host server 130 creates an account for the user. S101 includes the user at terminal 101 providing a new set of credentials, or a key, to host server 130. For instance, the user creates a user account by providing a new unique username, and password, among other details. The account is created locally, and additionally provisioned S103 to authentication server 140. In other words, host server 130 contains logic to access database 141 via authentication server 140, and request that the first time user 101 be added S105 to a user database within database 141.

The creation of the user account additionally requires that the user of terminal 101 and mobile device 110 is able to generate a PIN on mobile device 110. The PIN provides a second layer of authentication in addition to the key. To enable PIN generation at mobile device 110, an application is provisioned or installed S107 on mobile device 110. The application may be downloaded from authentication server 140, or provisioned via a cellular network, with S107 ensuring that the settings for PIN generation are identical between authentication server 140 and mobile device 110. In other words, if host server 130 has indicated that the PIN for all users is to be generated using a hash function that is parsed odd and limited to a certain length, then these preferences are defined on mobile device 110. Further, a unique identifier of mobile device 110 is acquired in S107, and stored S109 in user database 141. The unique identifier may be an International Mobile Equipment Identifier (IMEI), an electronic serial number (ESN), mobile equipment identifier (MEID), International Mobile Subscriber Identity (IMSI, unique to the subscriber instead of the device), ICCID (unique to the Subscriber Identity Module or SIM), or any equivalent identifier. In other embodiments, a more dynamic identifier is used, such as channel identifiers between mobile device 110 and a radio network of the mobile network, or a radio resource identifier such as the several BTS and BSC identifiers known in the art. In these embodiments, S109 is not necessary as the identifier will be different at different times. Therefore, to ensure accurate PIN generation at the authentication server, it is necessary to report the dynamic identifier to the authentication server by a network node, as will be described herein.

The dotted line between S109 and S111 separates the provisioning process from the usage described in S111-S125. The user begins the process by generating a PIN S111 at mobile device 110. As described above, generation of the PIN is performed by PIN generation logic, for instance an application, stored on a memory of mobile device 110. The PIN generation logic uses the current date and time (as provided by a network), a unique key of the user (such as the username used as the first layer of authentication), and a device identifier such as those described above. Further, the hash function parses the value to an odd or even number and to a fixed length, as is provided by the host server 130 and provisioned within PIN generation logic. At S113, the user at terminal 101 connects to host server 130 to access a service or resource. Via a user interface on terminal 101, the user provides the key (username/password), and the PIN that was displayed on mobile device 110 at S111. Host server 130 authenticates the user via the first set of credentials (the key) S115, determines that the key is correct, and then connects S117 to authentication server 140 to process the second layer of authentication, i.e. the PIN comparison. S117 includes a transmittal of the key and the device PIN (as received by the user). At S119, authentication server 140 queries database 141 for the record of the user, based upon the key provided by the user. Database 141 returns the record for the user, which includes a device identifier of mobile device 110, as well as the applicable hash function settings. At S120, hash function logic on authentication server 140 generates a hash based upon a current date and time, the key provided by the user, and the device identifier provided by database 141. Hash function S120 further parses the resulting value based on the odd/even and length settings applicable, and performs a comparison of the device PIN with the server PIN (i.e., the received PIN and the PIN generated at the server). If the two PINs match, authentication server 140 returns the result to host server 130. Host server 130 executes logic S123 to enable the user to access the resource, and then provides the resource/service to terminal 101 via the user interface. The service may be any online service, such as access to a user account. The service may be a transaction confirmation screen for an online retailer. Alternatively, the service may be access to an API, a virtual private network (VPN) on a remote computer, a control panel for a security system, or other applications that rely on authentication.

Figure 2:
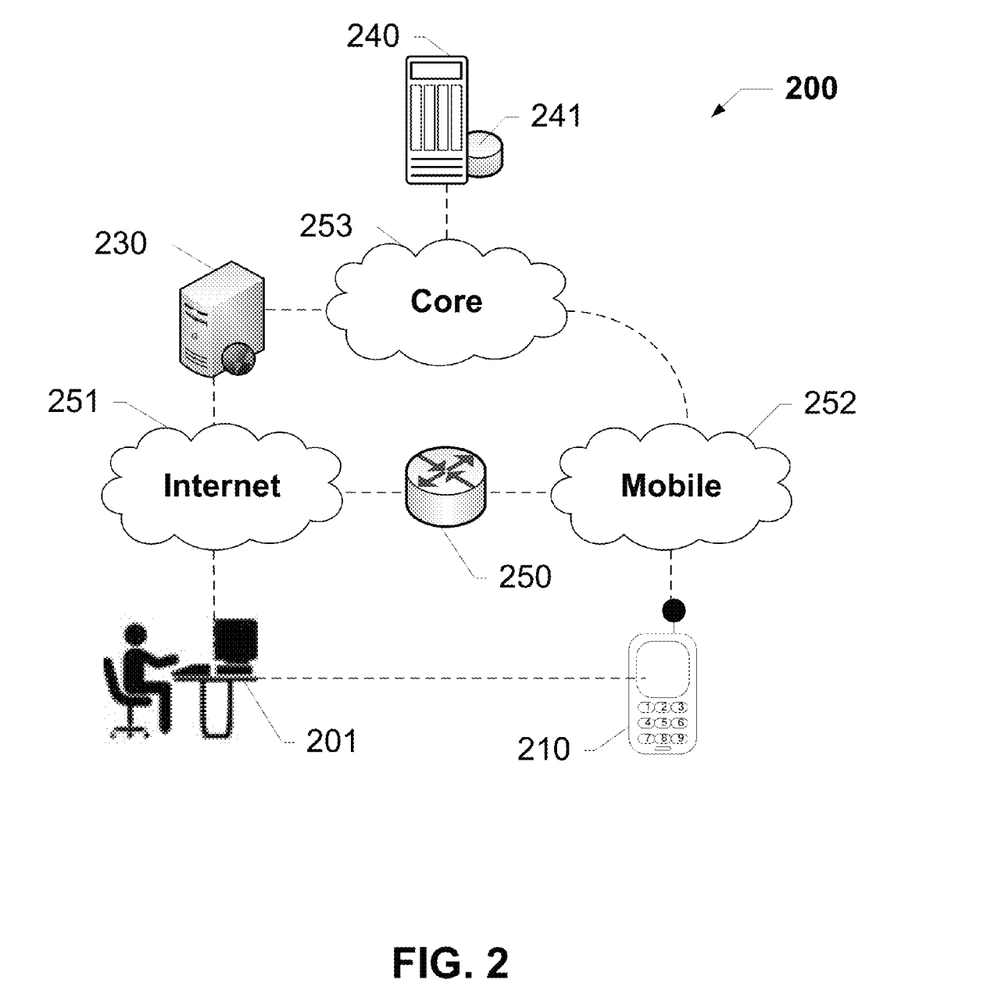
FIG. 2 shows the elements of a system for authenticating a user, according to an exemplary embodiment of the present subject disclosure.

FIG. 2 shows the elements of a system for authenticating a user, according to an exemplary embodiment of the present subject disclosure. System 200 includes a user at a terminal 201, and having in their possession a mobile device 210. Terminal 201 accesses host server 230 via a network such as internet 251. For instance, an application on terminal 201, such as a web browser, uses the HTTP or HTTPS protocol to access a web site hosted by host server 230. The web-site may be an APACHE module or similar front-end API. Other methods of accessing a service will become apparent to one of ordinary skill in the art upon reading this disclosure. Further, mobile device 210 communicates with a mobile network 252. Elements in mobile network 252 are not shown but include at least a radio network, a plurality of switches, and other servers. Mobile network 252 can also access internet 251 via gateway 250. Further, a core network 253 provides access to entities at the back-end of mobile network 252. Core network 253 may be an IP Multimedia System (IMS) Core, whereby access to authentication server 240 is governed by one or more edge routers, proxy servers, firewalls, etc.

Host server 230 is configured to access authentication assistance from authentication server 240. To access user database 241, host server 230 needs appropriate credentials and/or authorization to authentication server 240. User database 241 stores an account for host server 230, the account including a user database of the users of host server 230, as well as keys for the users and device identifiers of mobile devices associated with the users. In one exemplary embodiment, user database 241 is linked to an active directory or Lightweight Directory Access Protocol (LDAP) server containing domains or sub-domains for a plurality of hosts. Each host transmits a list of existing user keys to be provisioned into database 241. Further, the host 230 can define and customize the hash function to be used on authentication server 240, by specifying an odd or even parsing function, and a length for the generated PIN.

As described above, the user of terminal 201 begins the process by generating a PIN at mobile device 210. PIN generation logic provisioned on a memory of mobile device 210 uses the current date and time (as provided by a mobile network 252), the key associated with the user (such as the username used as the first layer of authentication), and a device identifier such as those described above. Further, the hash function parses the value to an odd or even number and to a fixed length, as is provided by the host server 230 and provisioned within the PIN generation logic. The user then uses a user interface on terminal 201 to provide the key (username/password), and the device PIN to host server 230. Host server 230 authenticates the user via the provided key, and transmits the key and the device PIN to authentication server 240 via core network 253. Authentication server 240 queries database 241 by providing the key, and pulls a device identifier of mobile device 210, as well as the applicable hash function settings. PIN generation logic on authentication server 240 generates a hash value based upon a current date and time (as provided by the core network 253, which is in communication with mobile network 252), the key provided by the user, and the device identifier provided by database 241, and the applicable odd/even and length settings. Authentication server 240 performs a comparison of the device PIN with the server PIN, and transmits the results to host server 230. A match informs host server of a successful authentication while a mismatch triggers the host server to request a new PIN from the user, lock the system, generate an alarm, etc.

According to embodiments of the present subject disclosure, any minor discrepancies of time between the mobile device PIN generation and the authentication server PIN generation may be accounted for by generating a plurality of server PINs corresponding to a time range or a time window. For instance, one can anticipate that the server PIN is generated a short time after the device PIN, owing to network propagation delays, traffic, etc. In such a case, the authentication server accounts for the delay by generating a plurality of PINs using time values ranging from a few moments in the past up until the present time. Table 1 shows the generation of a device PIN, while Table 2 shows the subsequent generation of a server PIN.

TABLE 1

| Date/Time | Device ID | Key | Hash | Parity | Size | PIN |
|---|---|---|---|---|---|---|
| 201008251316 | 53.435664.847693.1 | Admin | 1927f123e6b48b7bac | Odd | 6 | 19f13e |

TABLE 2

| Date/Time | Device ID | Key | Hash | Parity | Size | PIN |
|---|---|---|---|---|---|---|
| 201008251319 | 53.435664.847693.1 | Admin | c4e858a83e8b7b6b43 | Odd | 6 | f123e6 |
| 201008251318 | 53.435664.847693.1 | Admin | 123e6b48b7bac4e858 | Odd | 6 | 7bac4e |
| 201008251317 | 53.435664.847693.1 | Admin | 3e6b48b7ba6fe858a8 | Odd | 6 | 3e6b48 |
| *201008251316* | *53.435664.847693.1* | *Admin* | *1927f123e6b48b7bac* | *Odd* | *6* | *19f13e* |
| 201008251315 | 53.435664.847693.1 | Admin | 48b58ab6b44e85ee34 | Odd | 6 | e858a8 |

As can be seen in Table 2 above, the server PIN generation begins at a time of 13:19, and generates a plurality of pins going back a few minutes. The time window therefore includes 13:16, which was the time that the device PIN was generated (see Table 1). The correct pin is italicized in Table 2. The authentication server compares all generated PINs within the time window with the received device PIN to authenticate the user. It should be noted that the present subject disclosure is not restricted to the data formats listed in the above tables—the time can include seconds, milliseconds, and may not even use the date. The device ID is shown as an IMEI format, but the other identifiers described above and their equivalents may also be used. The hash generation shown results in a hexadecimal value; however, other formats are possible. Finally, several other time windows are possible. Although minute-based increments are shown, the process is usually faster. Second or millisecond-based time windows are possible.

Figure 3:
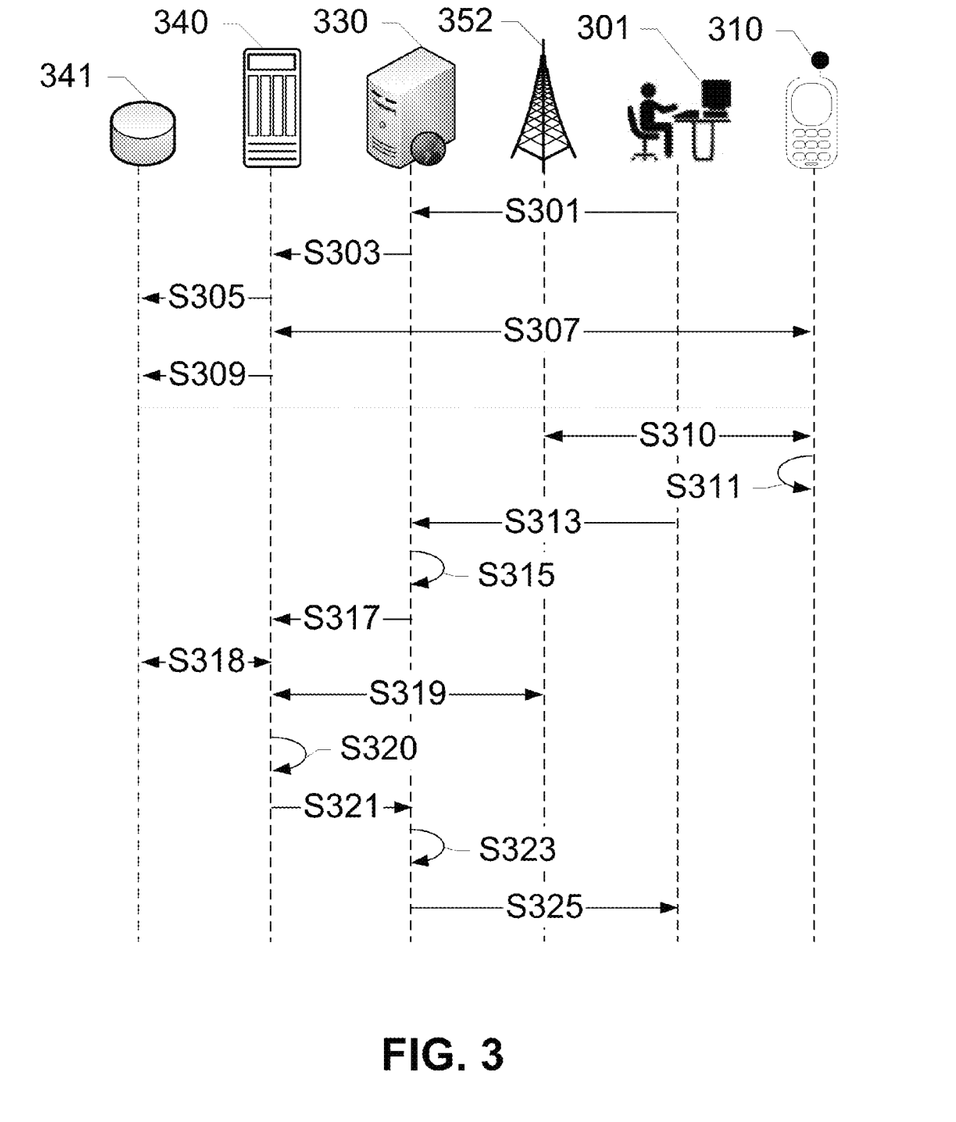
FIG. 3 shows a method for authenticating a user at an authentication server, according to an exemplary embodiment of the present subject disclosure.

FIG. 3 shows a process flow for authenticating a user using a dynamic device identifier, according to an exemplary embodiment of the present subject disclosure. Similar to the embodiment of FIG. 1, a user on a terminal 301 is able to access host server 330 over a network such as the Internet. The user further owns a mobile device 310 that is shown to be in communication with radio network 352. Host server 330 communicates with authentication server 340 over one or more networks. Authentication server 340 is in communication with database 341.

According to this exemplary embodiment, the provisioning process S301-S309 is substantially the same as in the embodiment of FIG. 1. Specifically, the user via terminal 301 accesses a service hosted on host server 330. The service can be an online service, such as accessing the user's bank account information online, or logging into any user account. If terminal 301 is accessing host server 330 for the first time, as in S301, then host server 330 creates an account for the user. S301 includes the user at terminal 301 providing a new set of credentials, or a key, to host server 330. For instance, the user creates a user account by providing a new unique username and password, among other details. The account is created locally, provisioned S303 to authentication server, and the first time user 301 is added S305 to a user database within database 341. Further, the creation of the user account requires provisioning S307 of a PIN generation application/logic at mobile device 310. The application may be downloaded from authentication server 340, or provisioned via a cellular network, with S307 ensuring that the settings for PIN generation are identical between authentication server 340 and mobile device 310. A unique identifier of mobile device 310 is acquired in S307, and stored S309 in database 341. In this exemplary embodiment, the identifier can be any identifier of the device, such as a network address, phone number, SIM-card variable, etc. The purpose of this identifier is not to generate the PIN, but to request the dynamic identifier when needed, such as channel identifiers, radio resource identifiers, etc.

The dotted line between S309 and S310 separates the provisioning process from the usage described in S310-S325. The user begins the process by connecting to the network 352 and acquiring one or more dynamic variables from the network 352. The dynamic variable is unique to the device/user of the device, but only temporarily. For instance, the dynamic variable may be a channel ID, a 3G transport channel information used by mobile device 310, physical downlink format indicators, logical channels (BCCH, CCCH, DCCH, etc.), and so on, as is known in the art. Depending on the dynamic variable used, mobile device 310 may have to request the identifier before generating a PIN, or may already be able to locally access the identifier. The PIN generation application would be appropriately configured to determine this information. At S311, PIN generation logic uses the current date and time (as provided by a network), a unique key of the user (such as the username used as the first layer of authentication), and the dynamic device identifier such as those described above. Further, the hash function parses the value to an odd or even number and to a fixed length, as is provided by the host server 330 and provisioned within PIN generation logic. At S313, the user at terminal 301 connects to host server 330 to access a service or resource. Via a user interface on terminal 301, the user provides the key (username/password), and the PIN that was displayed on mobile device 310 at S311. Host server 330 authenticates the user via the first set of credentials (the key) S315, determines that the key is correct, and then connects S317 to authentication server 340 to process the second layer of authentication, i.e. the PIN comparison. S317 includes a transmittal of the key and the device PIN (as received by the user). At S319, authentication server 140 queries database 341 for the record of the user, based upon the key provided by the user. Query S318 further requests the first variable provisioned in S309, such as the telephone number, static variable, etc. Database 341 returns the record for the user, which includes the static identifier of mobile device 310, as well as the applicable hash function settings. At S319, authentication server 340 queries the radio network 352 for the same dynamic variable used to generate the device PIN in S311. Since provisioning step S307 aligned the PIN generation of device 310 and server 340, server 340 knows to request the same dynamic identifier. The request is accompanied with the static identifier, in order to identify the device 310, and subsequently, the appropriate dynamic identifier. Radio network 352 reports the dynamic identifier to authentication server 340. This process is facilitated by the fact that the network operator of the authentication server is the same entity as the operator of the radio network 352.

Upon receiving the dynamic variable, at S320, hash function logic on authentication server 340 generates a hash based upon a current date and time, the key provided by the user, and the dynamic device identifier provided by radio network 352. Hash function S320 further parses the resulting value based on the applicable odd/even and length settings, and performs a comparison of the device PIN with the server PIN (i.e., the received PIN and the PIN generated at the server). Hash function S320 may generate additional server PINs to encompass a time window, accounting for any delays. If the PINs match, authentication server 340 returns the result to host server 330. Host server 330 executes logic S323 to enable the user to access the resource, and then provides the resource/service to terminal 301 via the user interface.

Figure 4:
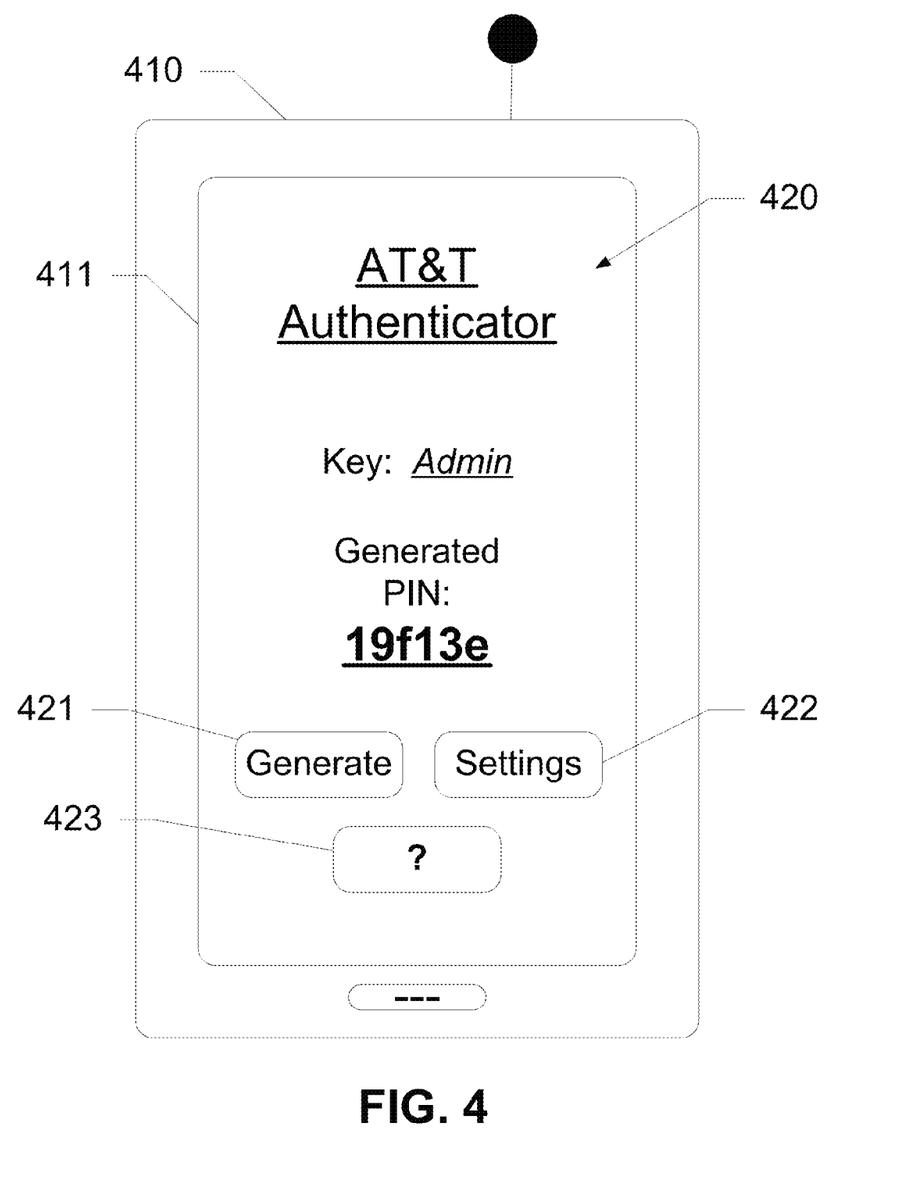
FIG. 4 shows a method for authenticating a user at a mobile device, according to an exemplary embodiment of the present subject disclosure.
Figure 5A:
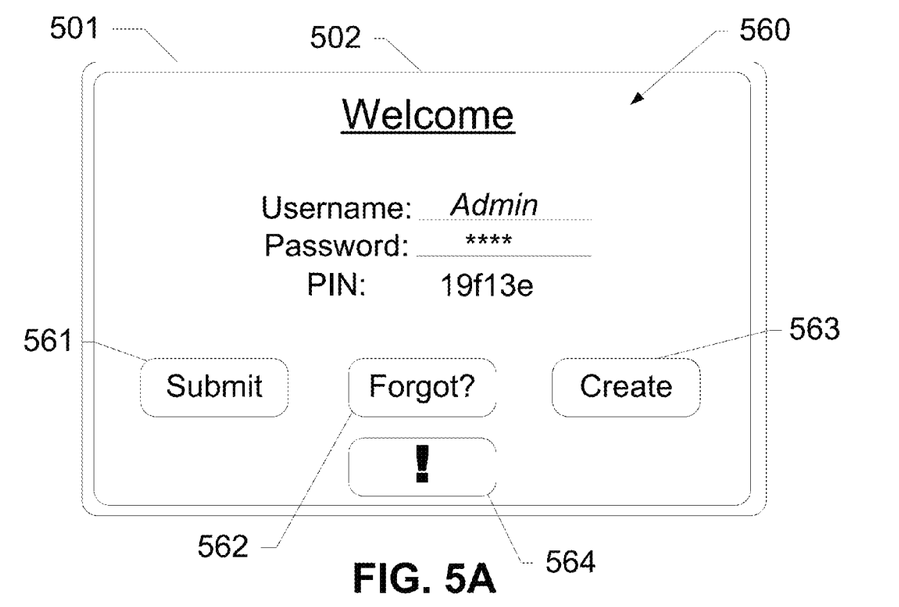
FIGS. 5A and 5B show screenshots for authenticating a user in communication with a host server, according to an exemplary embodiment of the present subject disclosure.
Figure 5B:
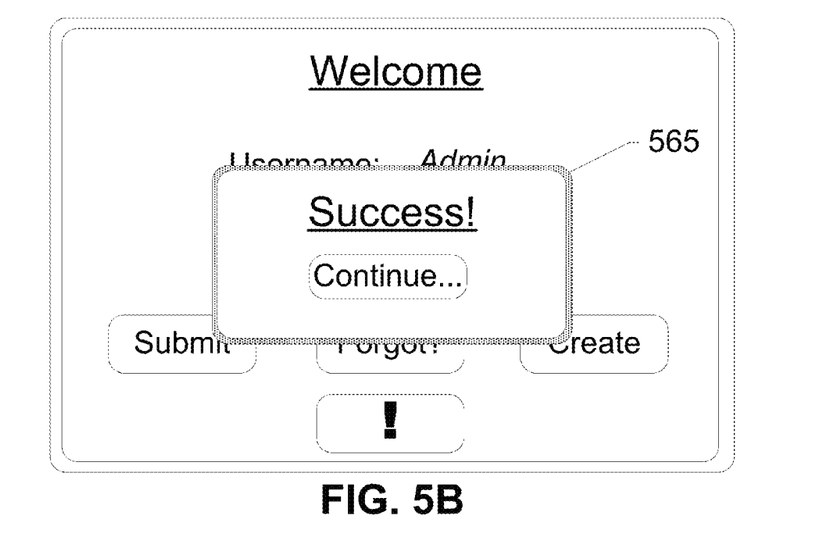

FIGS. 4, 5A, and 5B all show various screenshots of a user experience according to an exemplary embodiment of the present subject disclosure. Generally, it can be assumed that the flow follows the exemplary network flow of FIGS. 1 and 3.

FIG. 4 shows a PIN generation application on a mobile device, according to an exemplary embodiment of the present subject disclosure. In this embodiment, mobile device 410 is shown having a touchscreen 411. However, other types of devices can be used, including those with keyboards/keypads for input. In either case, display 411 shows a hash generation application 420, having an alphanumeric input for a Key, as well as button for PIN generation 421, settings 422, and help 423. A user may input his/her unique key, and push button 421 to execute PIN generation logic 420. Application 420 generates a hash value using the provided Key, a current date and time acquired either from the network or device 410 itself, and a device identifier. The device identifier may be a static variable unique to the hardware on the device, or a dynamic variable as described above. In the case of a dynamic variable, application 420 may have to request the mobile network for the value of the identifier. Upon execution, the PIN value "19f13e" is generated and displayed. Settings 422 allow the user to customize the application, including the selection of identifiers, how to connect to the network, etc. In some embodiments, settings allow the user to modify the PIN length as well as the odd/even parsing functions, depending upon the provisioning between the host and the authenticator. Help 423 provides additional descriptions of the features of the application, and possibly tutorials and answers to frequently asked questions.

FIGS. 5A and 5B show an authentication screen on a terminal, according to an exemplary embodiment of the present subject disclosure. Terminal 501 has a screen 502 that doubles as an input and an output device. For instance, screen 502 is a touch-sensitive screen, enabling a user to select options such as Submit button 561 or emergency button 564. Screen 502 may also include a touch-screen keyboard for inputting a username and a password. In other embodiments, screen 502 is merely an output device, and an external keyboard/mouse combination enables a user to provide input. As described above, and as will become evident to one of ordinary skill in the art upon reading this disclosure, user interface 501 may be provided in a number of situations. For instance, user interface 501 is a control panel for a security system that is restricting access to a secure resource. In such a case, the secure resource is the service that the user is attempting to access. In other examples, user interface 501 may be accessible via any terminal such as a computer accessing the internet, or a remote terminal accessing a VPN.

In either case a user inputs the first credentials (including the key), as well as the device PIN, and pushes the submit button 561. The user can always push the "forgot" button 562 to initiate password retrieval measures, or the "create" button 563 to create a new account to use the service, which would trigger the provisioning process described above. Emergency button 564 calls for help, or triggers an alarm, depending on the system in place. FIG. 5B shows the result of a successful authentication. The submitted device PIN is verified at the authentication server as matching with the server PIN generated using the methods described above. The host then welcomes the user in window 565, and offers the user to continue using the service.

In other embodiments, the PIN-matching process is one of a series of authentication mechanisms, including but not limited to a name and password combination, PIN code entry, biometric authentication (fingerprinting, eye-scanning, voice recognition), radio-frequency identification (RFID), and so on. In alternate embodiments, user interface 502 is a control panel on a security system, or any other system that places a physical barrier between the user and the service, such as a safety-deposit box, safe, restricted area, control room in an industrial process, etc. Further, alternate embodiments of the present subject disclosure enable the user to access the user interface via the same mobile device that he would receive the picture message on.

Figure 6:
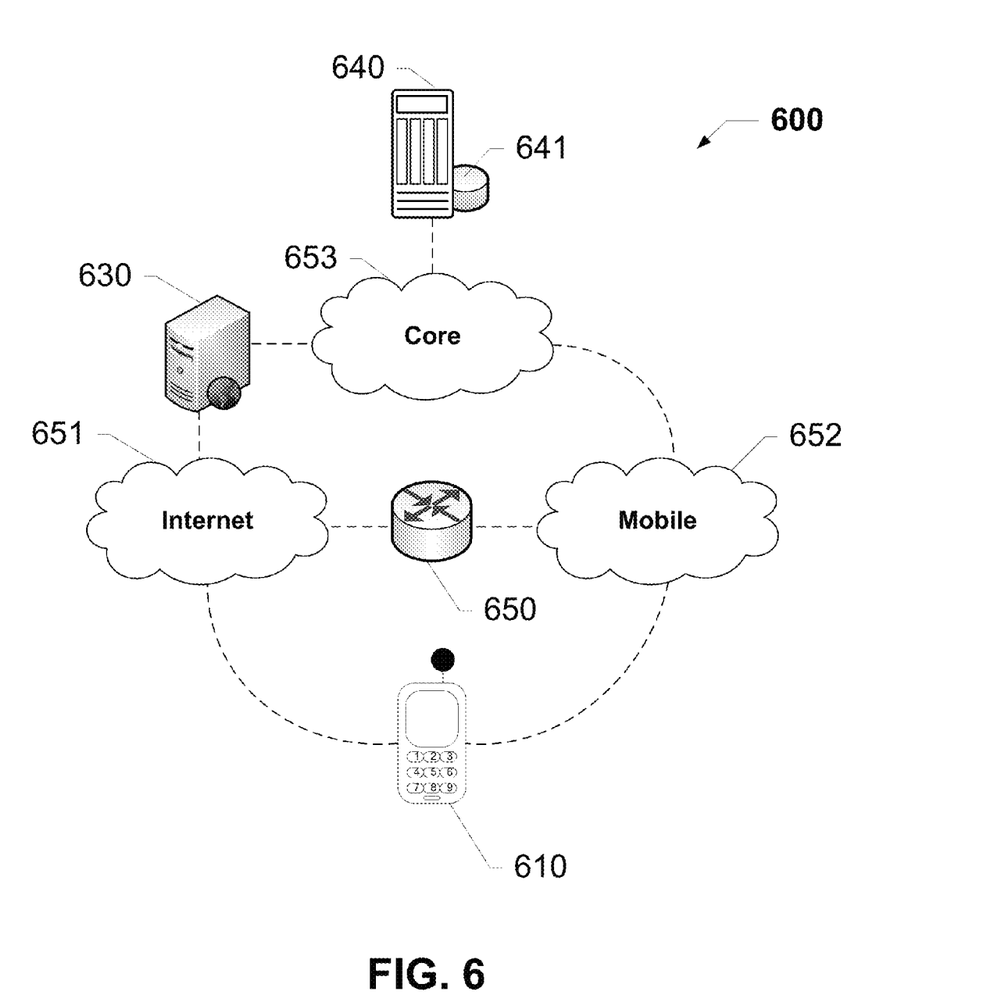
FIG. 6 shows a system for authenticating a user of a mobile device, according to an exemplary embodiment of the present subject disclosure.

FIG. 6 shows a system for authenticating a user via a mobile device, according to an exemplary embodiment of the present subject disclosure. System 600 is substantially similar to system 200 shown in FIG. 2. Specifically, a user accesses host server 630 via a network such as the internet 651, and can also communicate with a mobile network 652. However, in this case both the Internet 651 and mobile network 652 are being accessed via the same device, i.e. mobile device 610. In other words, mobile device 610 is a dual mode device, having a plurality of transceivers that connect to different types of networks. This is achieved by equipping mobile device 610 with a 3G transceiver to communicate with mobile network 653, as well as a Wi-Fi or other type of transceiver that enables communication with internet 651. Gateway 650 provides connectivity between networks 652 and 651, while a core network 653 provides access to entities at the back-end of mobile network 652, such as authentication server 640 having user database 641.

In operation, host server 630 needs to provision an account for host server 630, in database 641, including a list of users that access the service(s) offered by host server 630. A registered user accesses host server 630 using mobile device 610, for instance, by pulling up an application on mobile device 610 that requires additional authentication, such as a mobile banking or mobile payment application. PIN generation logic on mobile device 610 displays a code that is input by a user into the application. To maintain security, the applications are separate and isolated from one another. Consequently, the user would load the PIN generator, generate the PIN, and then load the application to access the server and input the PIN along with a key. The rest of the process is as described above, i.e. host server 630 authenticates the user via the provided key, and transmits the key and the device PIN to authentication server 640 via core network 653. Authentication server 640 queries database 641 by providing the key, and pulls a device identifier of mobile device 610, as well as the applicable hash function settings. PIN generation logic on authentication server 640 generates a hash value based upon a current date and time (as provided by the core network 653, which is in communication with mobile network 652), the key provided by the user, and the device identifier provided by database 641, and the applicable odd/even and length settings. Authentication server 640 performs a comparison of the device PIN with the server PIN, and transmits the results to host server 630. A match informs host server 630 of a successful authentication, and a mismatch triggers host server 630 to request a new PIN from the user, lock the system, generate an alarm, etc. Alternatively, a dynamic identifier is used, whereby authentication server 640 queries the mobile network 652 for the identifier, and uses the dynamic identifier to generate the PIN.

In an alternative to all of the above embodiments, the authentication server does not perform the PIN matching, but instead transmits the server PIN to the host server. The host server then matches the submitted device PIN and the server PIN to authenticate the user. This process may also be used for a plurality of server PINs generated for a time window, whereby the plurality of server PINs are submitted to the host server. Further, the host server may additionally host the actual application to be downloaded/installed into the mobile device. In this embodiment, the host server creates an application with defined settings, which leaves the process of provisioning the application to the mobile device entirely up to the host server.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

What is claimed is:

1. A method comprising:
generating, by a server comprising a processor, a server PIN based upon a current time, a device identifier, and a key, the device identifier being associated with a mobile device and being retrieved from a user database in response to receiving the key from a host server in communication with the mobile device, wherein the key is received along with a device PIN from the host server, wherein the generating the server PIN comprises
computing a hash value based upon the current time, the device identifier, and the key, and
parsing the hash value using one of an odd and an even function to generate the server PIN, wherein the server PIN is limited to a defined length; and
determining, by the processor, a match between the server PIN and the device PIN;
wherein the mobile device is authenticated upon the determination of the match.

2. The method of claim 1, further comprising:
provisioning the user database with a plurality of device identifiers and a corresponding plurality of keys,
wherein said plurality of device identifiers and corresponding plurality of keys are provided by the host server.

3. The method of claim 1, wherein the key comprises any combination of a username and a password.

4. The method of claim 1, wherein the device identifier is a unique hardware identifier of the mobile device.

5. The method of claim 1, wherein the device identifier is a unique identifier of a communication channel between the mobile device and a mobile network, the method further comprising receiving the device identifier from a node on the mobile network.

6. The method of claim 1, wherein the determination of which parsing function to use, and the defined length, are provided by the host server.

7. The method of claim 6, wherein the device PIN is generated at the mobile device, the method further comprising:
installing a device PIN generation logic on the mobile device; and
programming the device PIN generation logic to generate the device PIN using the parsing function and defined length provided by the host server.

8. The method of claim 1, wherein the determination of which parsing function to use, and the defined length, are provided by the user of the service.

9. The method of claim 1, further comprising generating a plurality of server PINS based upon a window of time, wherein the window of time comprises the current time, a past time, and a future time.

10. The method of claim 1, further comprising transmitting to the host server a result of the comparison of the server PIN and the device PIN.

11. The method of claim 1, wherein the host server is a web server, and wherein the mobile device is authenticated for access to a resource hosted on the web server.

12. A system comprising:
an authentication server comprising a processor and a memory; and
an authentication logic on the memory, wherein upon execution of the authentication logic by the processor, the processor performs operations comprising:
generating a server PIN based upon a current time, a device identifier, and a key, the device identifier being associated with a mobile device and being retrieved from a user database in response to receiving the key from a host server in communication with the mobile device, wherein the key is received along with a device PIN from the host server, wherein generating the server PIN comprises
computing a hash value based upon the current time, the device identifier, and the key, and
parsing the hash value using one of an odd and an even function to generate the server PIN, wherein the server PIN is limited to a defined length, and
determining a match between the server PIN and the device PIN received from the host server to authenticate the mobile device in communication with the host server across a network.

13. The system of claim 12, wherein the user database stores a plurality of device identifiers corresponding with a plurality of keys, and wherein the device identifier corresponds to the key received from the host server to generate the server PIN.

14. The system of claim 12, wherein the device identifier is a dynamic identifier unique to a communication channel between the mobile device and the network, the system further comprising a node on the network for forwarding the device identifier to the authentication server to generate the server PIN.

15. The system of claim 12, wherein the host is a web server, and wherein the network is the internet.

16. The system of claim 12, wherein the mobile device comprises a user interface for generating the device PIN.

* * * * *